United States Patent [19]

Casto

[11] 4,132,496

[45] Jan. 2, 1979

[54] PRECISE ANGLE DRILLING ATTACHMENT

[76] Inventor: John W. Casto, 2506 N. 20th Rd. #402, Arlington, Va. 22201

[21] Appl. No.: 703,432

[22] Filed: Jul. 8, 1976

[51] Int. Cl.² .............................................. B23B 45/14

[52] U.S. Cl. .................................. 408/112; 408/115 R

[58] Field of Search .................. 408/112, 115, 110, 76

[56] References Cited

U.S. PATENT DOCUMENTS

| | | | |
|---|---|---|---|
| 1,590,643 | 6/1926 | Neuwelt | 408/112 |
| 2,670,638 | 3/1954 | Roy | 408/112 |
| 2,831,376 | 4/1958 | Daniels | 408/112 |
| 3,776,647 | 12/1973 | Hart | 408/112 |
| 3,890,058 | 6/1975 | Self et al. | 408/112 |

FOREIGN PATENT DOCUMENTS

| | | | |
|---|---|---|---|
| 583,158 | 12/1946 | United Kingdom | 408/76 |

*Primary Examiner*—Leonidas Vlachos

*Attorney, Agent, or Firm*—James C. Wray

[57] ABSTRACT

A universal mounting portable electric drill angle drilling attachment comprising a base, angularly adjustable spring return upright, angle indicia, and drill clamping means.

2 Claims, 5 Drawing Figures

PRECISE ANGLE DRILLING ATTACHMENT

BACKGROUND OF THE INVENTION

Field of the Invention

This invention relates to tools and assorted accessories and in particular, to holding devices for portable electric drills and the like.

Description of the Prior Art

There have been many devices in the prior art for holding portable electric drills, attesting to the popularity of low cost limited speed reducer electric motors with chucks for holding rotary toolbits.

Some such devices hold the drill in a horizontal fixed position. Some others attempt to imitate a drill press by making the drill movable towards to workpiece along a rigidly controlled path. Some of the devices in the prior art such as U.S. Pat. Nos. 3,534,639 to Freichler, 3,890,058 to Self et al, 2,953,045 to Carles, and 3,119,286 to Forman et al permit angle drilling by inclining the controlled path to the work. Treichler and Self et al provide spring return of the tool.

But the devices that exist generally suffer from a poor holding method for the drill unless the device has been made for one specific brand and model of drill and is used for it.

Otherwise, lining up and securely clamping the drill is often not easy. It is desirable to have a relatively universal mounting for various electric drill bodies.

SUMMARY OF THE INVENTION

It is therefore an object of this invention to overcome the limitations and disadvantages in the portable drill angle attachment devices in the prior art and currently available in the market.

One of the objects of the invention is to provide a portable drill angle attachment device embodying improved principles of design and construction.

An important object of the invention is to provide a portable drill angle attachment device which is comprised of a number of simple durable parts and components which can be economically manufactured and readily assembled.

A significant object of the invention is to provide a portable drill angle attachment device, so designed and constructed that it can be readily applied to almost any typical portable electric drill now in use.

Another object of the invention is to provide a universal mounting portable rotary tool attachment for securely mounting any brand and model of portable rotary tool.

A further object of the invention is to provide an angle drilling attachment with an adjustable depth gauge and stop.

A precise angle drilling attachment, according to the principles of this invention, comprises a base, a hinge mounted angularly adjustable spring return upright with interchangeable nesting mounting blocks, angle indicia, drill clamping means, and a depth travel indicator and adjustable stop.

Further objects and advantages of this invention will appear more clearly from the following description of a non-limiting illustrative embodiment and the accompanying drawings in which like numerals designate like parts throughout the several views.

BRIEF DESCRIPTION OF THE DRAWINGS

Briefly summarized, a preferred embodiment of the invention is described in conjunction with an illustrative disclosure thereof in the accompanying drawings, in which.

Figure 1:
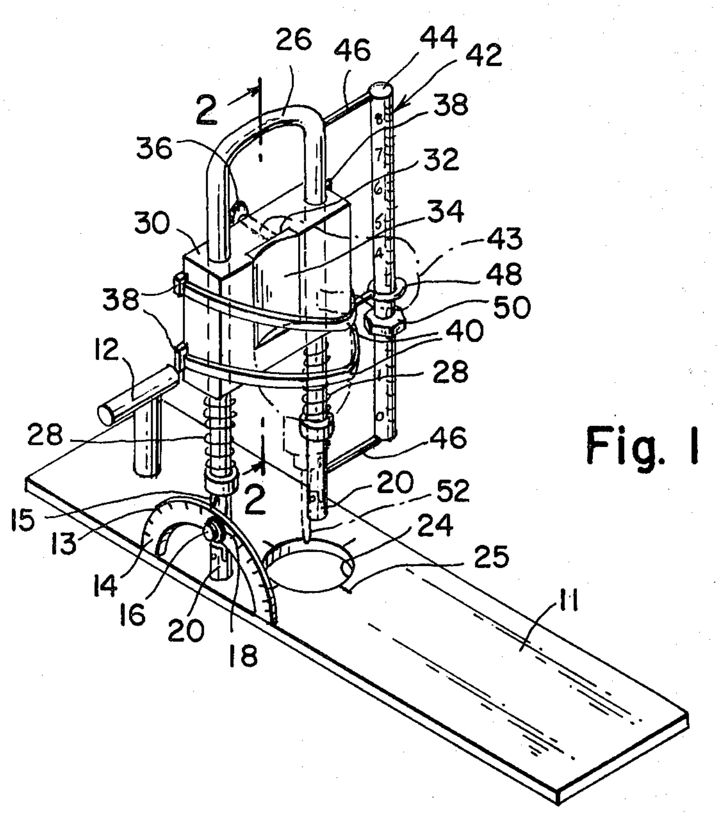
FIG. 1 is a pictorial representation of the precise angle drilling attachment according to the principles of this invention.
Figure 2:
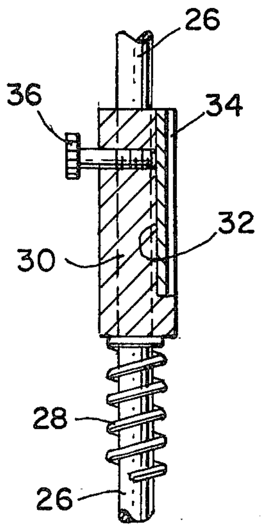
FIG. 2 is a partial sectional view taken substantially along line 2—2 in FIG. 1.

FIGS. *3a*, *3b* and *3c* illustrate various alternative drill plates for use aligning a portable electric drill.

DETAILED DESCRIPTION OF THE PREFERRED EMBODIMENT

In the drawings a universal mounting precise angle drilling attachment embodying features of the invention is illustrated having a base 11 which may be provided with a handle 12 for easy carrying. A sector 14 marked with positional indicia 13 protrudes from base 11. A "U" shaped ways 26 is mounted to base 11 via hinges 20 which may have clamping means at the hinge point.

A sliding frame 30 slides upon ways 26 and is biased to return by springs 28 and is provided with a nest 32 in which a contour block 34 is fitted which may be adjusted by one or more bolts 36.

A portable rotary tool such as a drill 43 may be held against the contour block 34 by at least one flexible strap 40 retained to frame 30 by clips 38.

Ways 26 mounts in an area adjacent to sector 14 an indicator 15, a clamping bolt 16 and fastener such as a washer 18 which may be employed to maintain an angular ways position.

A hole 24 may be provided in base 11 and suitably marked with center lines 25 to permit usual alignment of a drill bit 52 when the ways is orthogonal to the base.

A graduated length bar 44 with suitable threads is mounted 46 to ways 26 and is provided with suitable positional indicia. In combination with an indicator 48 attached to sliding frame 30 it constitutes a depth gage 42. A depth stop may be provided by one or more nuts 50 threadably engaged with bar 44.

Flexible straps 40 may be springs, rubber, worm type hose clamps, or other suitable members.

A workpiece may be mounted on the base 11 or the position may be reversed.

Ways 26 is most economically made of round bar.

Figure 3A:
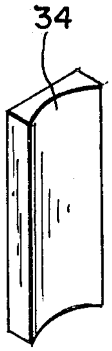
Figure 3B:
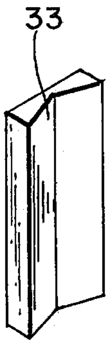
Figure 3C:
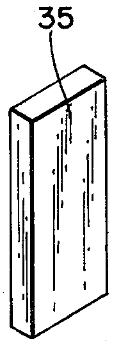

As shown in FIG. 3, contour block 34 may be concave, Vee 33, flat 35, or such other shape as desired to suit the housing of a portable rotary tool such as an electric or pneumatic drill.

Use of more than one bolt 36 permits adjustment of the tool so that the drill bit can be aligned with centerlines 25.

From the foregoing, the construction and operation of the device will be readily understood and further explanation is believed superfluous.

The invention includes all novelty residing in the description and drawings. It is obvious to those skilled in the art that various minor changes can be made without departing from the concept of this invention and all such as fall within the reasonable scope of the appended claims are included.

I claim:

1. An angle drilling attachment for use with a portable rotary tool, such as an electric drill, comprising a base to which is orthogonally attached a sector marked with positional indicia, and two blocks which hingedly mount a one piece U-shaped ways upon which is movably mounted a sliding frame having a nest into which is fitted one of a plurality of different interchangeable contour blocks wherein a portable rotary tool is fitted against a contour block, means for adjusting the contour block relative to the nest of the sliding frame for fitting the contour block to the contour of the portable rotary tool, and which frame mounts rotary tool retaining means; and which ways mounts spring returning means for the frame; and indicating means mounted on the slidable frame relative to the sector and retaining means mounted on the sector; frame displacement indicating means including a threaded graduated length bar attached to the one piece U-shaped ways having an indicator attached to the sliding frame which indicates position on the bar and movable stop means for limiting the movement of the sliding frame in the direction of the base.

2. An attachment as in claim 1 wherein the movable stop means is a threaded nut which is combined with the length bar which is provided with threads.

* * * * *